Aug. 4, 1959 G. F. MUSOLF 2,898,536

AUTOMATIC IRIS CONTROL FOR TELEVISION CAMERAS

Filed March 31, 1955

INVENTOR.
GUNTER F. MUSOLF
BY
ATTORNEY 2,898,536
Patented Aug. 4, 1959

2,898,536

AUTOMATIC IRIS CONTROL FOR TELEVISION CAMERAS

Gunter Franz Musolf, Pitman, N.J., assignor to Radio Corporation of America, a corporation of Delaware Application March 31, 1955, Serial No. 498,153
7 Claims. (Cl. 318—290)

The invention relates to the optical systems of television camera equipment, and it particularly pertains to the automatic control of these optical systems under varying lighting conditions.

The performance of any photosensitive apparatus varies with variations in the intensity of light projected upon it. One example of apparatus subject to such conditions is the television camera, wherein the light from an object is transferred to the photosensitive apparatus by means of one of several objective lenses of differing focal lengths. The object to be televised itself is frequently of a character causing the light impinging upon the photosensitive image signal generating device to vary over a considerable range. In a television studio, the lighting provided for the subject can be controlled to some extent, however, in order to produce the desired dramatic effects by means of lighting, it is necessary to impose limitations on the maintenance of substantially constant lighting in the studio. No such lighting is available for the operation of television camera use out-of-doors and consequently, the variation in lighting can be great. Also the intensity of lighting out-of-doors can be affected rather abruptly by such uncontrollable events as drifting clouds and the like. All such factors give rise to undesirable effects in black-and-white image signal production; and for color television signal generation, even less variation in lighting can be tolerated.

In such optical systems, suitable compensation for variations in lighting is produced by adjustment of a light intensity-controlling device such as an iris diaphragm. Conventional television cameras are provided with such apparatus in a variety of types and arrangements, varying from manually controlled iris diaphragms individual to each of a plurality of objective lenses arranged in a turret at the front of the camera to the automatically controlled iris diaphragm arranged in an optical system which is common to a plurality of objective lenses. The iris diaphragm is arranged between the lens turret and an image plane located on the photosensitive electrode of a single black-and-white camera or between the lens turret and the usual color selective apparatus leading to a plurality of photosensitive electrodes one on each of a plurality of image pickup tubes in a color television camera. In either case, the iris diaphragm is located in a zone where the light rays are substantially parallel and is adjustable so as to suitably vary the intensity of the transferred light irrespective of the objective lens selected.

It has been recognized that automatic control of the light intensity is desirable because of the inability of the video camera operator to interpret properly the need for and to adjust rapidly the iris diaphragm or the mechanism employed to drive the same. The automatic iris equipment according to the invention is improved in that it is not subject to hum and noise pickup due to obtaining the light level information across high impedance source, no mechanical or electronic chopper is necessary to provide an alternating voltage proportional to the D.-C. voltage or normal iris setting, nor is any integrating network needed to decrease the distortion introduced by the chopper, and a simpler motor control circuit is provided.

An object of the invention is to provide an improved automatic system for adjusting the light intensity-controlling element of a television camera optical system or the like.

Another object of the invention is to provide an improved electric motor controlling circuit for starting and stopping an electric motor coupled to an iris diaphragm.

Still another object of the invention is to provide an improved stabilized motor reversing and stopping amplifier or controlling amplifier for the control of electric motor used in the adjustment of iris diaphragm of similar apparatus.

A further object of the invention is to provide any improved reversible stopping arrangement for a braking motor of the type used for controlling an iris diaphragm or like mechanical equipment.

According to the invention the alternating video output signal derived by scanning the target of an image pickup tube by deflecting an electron beam at a given rate is applied to an alternating voltage amplifying circuit peaked to obtain maximum response at a frequency corresponding to the given deflection rate, rectified and preferably filtered, to form a direct control potential proportional to the average light impinging on the target of the image pickup tube. This control potential is applied to an electric motor controlling circuit connected to an electric motor which is mechanically coupled to a light intensity controlling device, for example an iris or a neutral density filter, interposed in the optical lens system arranged between the object to be televised and the target of the image pickup tube to vary the amount of light admitted in response to mechanical adjustment by the electric motor. Further according to the invention a motor controlling circuit is arranged to shift a capacitive reactance element from one to another of two motor windings which are in phase quadrature relationship in response to the direct control potential obtained from evaluating the background of the scene televised. More particularly the windings of a pair of relays are connected in series in the anode-cathode circuit of an electron discharge device to the control element of which said direct control potential is applied. The capacitive reactance elements are connected to the armature structures associated with each of the relays and to the motors so that over one range of control potential neither relay is energized and the motor runs in a given direction. In the next range of control potential one relay only is energized to neutralize the capacitive reactance applied so that the motor stops and remains in an idle condition ready to run again in either direction. In the final range of control potential both relays are energized to shift the capacitive reactance with respect to the motor windings such that the motor runs in the opposite direction.

Further according to the invention, resistance elements are interposed in the motor controlling circuit to reduce the heat rise of the motor under the idle condition while interposing only one resistance element under the active conditions whereby the motor torque and speed are not appreciably reduced.

Still further according to the invention the windings of the motor are connected into the motor controlling circuit by means of limit switches and capacitive reactance elements so that the motor windings themselves are employed to produce the proper phase relationship to stop the motor and hold it in the idle condition ready for reversal upon power being applied by the switching device of the motor controlling circuit in response to a change in the applied direct control potential.

In order that the practical aspects of the invention may be fully appreciated and readily put to practice, an express embodiment of the invention is described hereinafter with reference to the acompanying drawing in which.

Figures 1, 2:
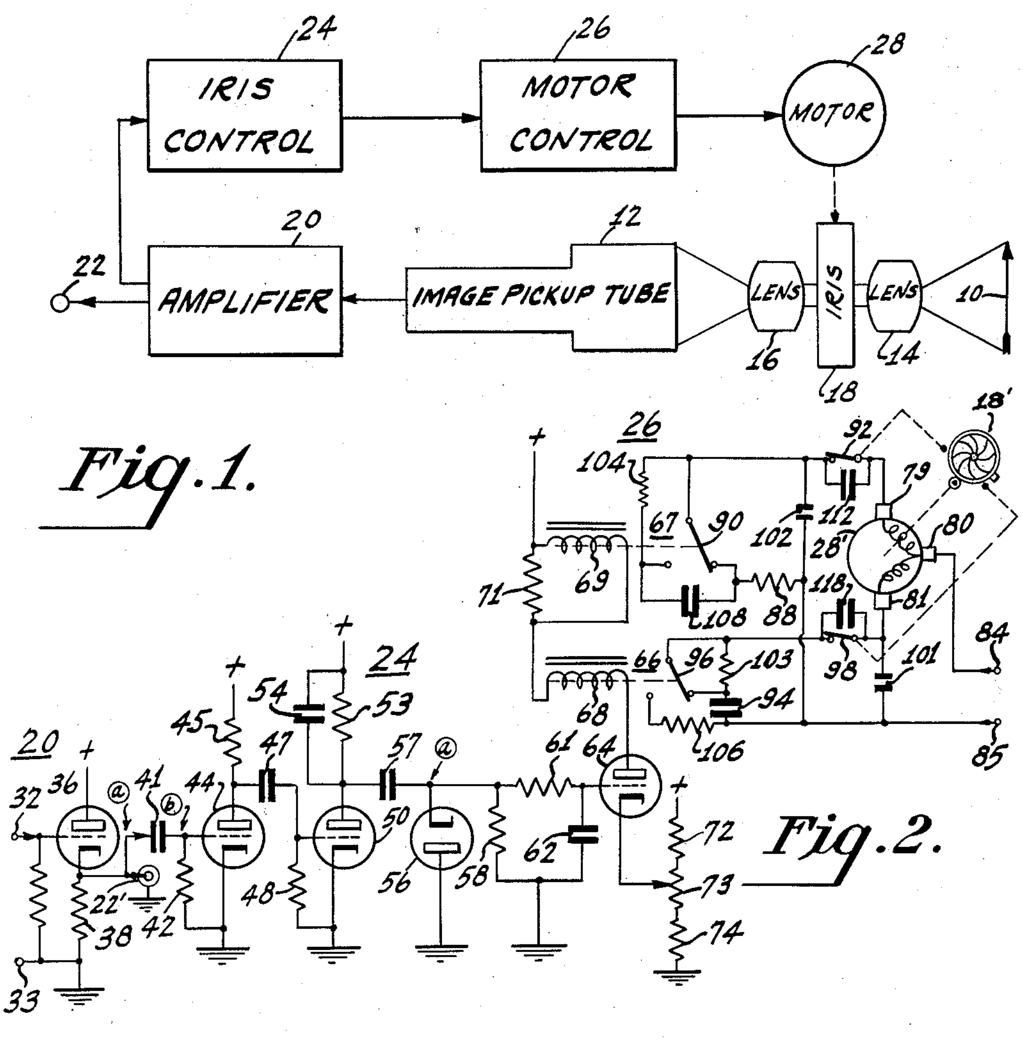
Fig. 1 is a functional diagram of a television camera incorporating circuitry according to the invention.
Fig. 2 is a schematic diagram of circuitry according to the invention as outlined in Fig. 1.

A functional diagram of a typical television camera used for generating television image signals is shown in Fig. 1. Light from an object 10 to be televised is projected onto the photo-sensitive target of an image pickup tube 12 by means of an optical system represented by means of a pair of condensing object lenses 14, and 16. The amount of light from the object 10 that is projected onto the photosensitive target of the image pickup tube 12 is controlled by means of an iris diaphragm 18 shown as being interposed between the objective lenses 14, 16.

It is sometimes preferable that in addition to the iris diaphragm 18 a neutral density filter will be interposed in order to effect additional attenuation for extremely bright light and in some instances it may be desirable merely to substitute a neutral density filter for the iris diaphragm 18. Such neutral density filter is not shown because it may be arranged in similar manner to the iris diaphragm 18 and similar control circuitry according to the invention may be applied thereto without the necessity of a separate detailed description. It should be understood that the optical system with which the arrangement according to the invention is to be used may be almost any one of the number of optical systems associated with photographic and television cameras and the like and that the neutral density filter and the iris diaphragm may be of the same general types commonly used in such systems. The most common type of iris diaphragm includes a plurality of overlapping leaves arranged to define an aperture and linked usually by gearing to an adjusting mechanism so that in moving, usually by rotating, the housing of the iris and adjusting mechanism is activated to effect a movement of the leaves in manner suitable to vary the size of the aperture through which the light passes. It is also understood that as astigmatism correctors, image relaying lenses, and dicroic reflectors or other types of light separators may be used in television cameras if desired along with apparatus controlled by the circuit arrangement according to the invention.

In the image pickup tube 12 an electron beam is generated and deflected across the target in one direction at a prearranged deflection rate and in a direction normal to the one direction at a given rate of deflection to generate an output signal containing image information. This output video signal is then applied to an amplifying circuit 20 wherein it is amplified and made available at output terminals 22 for application to the remainder of the television signal transmission system. According to the invention the video output signal is also applied to an iris control voltage generating circuit 24 for producing a direct control potential proportional to the average light level impinging on the target of the image pickup tube 12. This control potential is applied to a motor controlling circuit 26 which controls the operation of a reversible electric motor 28 the drive shaft of which is coupled mechanically, usually by gearing, to the iris diaphragm 18 to dilate the iris. As the average level of light passing through the iris of the diaphragm 18 varies, the reference voltage, derived from the image information produced by the image pickup tube 12 and amplified by the amplifier 20, also varies in direct proportion. Also the iris controlling potential obtained at the output of the iris controlling potential generating circuit 24 varies in proportion to the reference voltage. The iris controlling potential is applied to the motor controlling circuitry 26 to effect rotation of the motor 28 in a direction which will dilate the iris diaphragm 18 to vary the light passing therethrough inversely proportional to the previous light level falling on the target of the image pickup tube 12. Thus the average light level is maintained at a substantially constant value.

Figure 3:
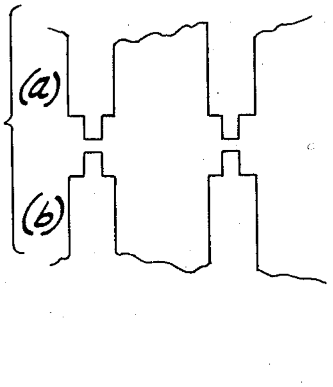
Fig. 3 is a graphical representation of waveforms obtained at points in the circuitry of Fig. 2.

A schematic diagram of circuitry according to the invention for performing the functions outlined in Fig. 1 is given, by way of example only, in Fig. 2. Signals containing image information developed by the image pickup tube 12 and processed by the amplifying stages (not shown) in the amplifier 20 are presented at the input terminals 32 and 33 of a cathode follower tube 36. In practice the output terminals 22′ leading to the remainder of the television transmission circuitry are coupled across the cathode resistor 38 of the cathode follower tube 36. It should be understood, however, that if high impedance output is required by the general television transmission circuitry for any reason, the cathode follower 36 may be used as a separate means for obtaining the desired low impedance output to drive the background amplifying circuit of the iris control potential generating circuit 24 according to the invention. The video output signal containing image information is applied by means of a coupling capacitor 41 and a grid resistor 42 to the input circuit of an electron discharge system in the form of a triode tube 44. The amplified and inverted video waves appear across a load resistor 45 and is applied by means of another coupling capacitor 47 and grid resistor 48 to the input circuit of another amplifying electron discharge structure or vacuum tube 50. The polarity of the signal applied to the grid of the first amplifier tube 44 is such that white level signals are most positive as shown in Fig. 3(*a*). White level signals are then most negative as the anode of the first amplifier tube 44 and at the grid of the second amplifier tube 50 as shown in Fig. 3(*b*). The cathode of the second amplifier tube 50 being grounded causes noise peaks in the black direction to be limited so there will be no tendency to affect the control voltage developed. The signal at the anode of the second amplifier tube 50 is developed across the load resistor 53 and the white level signals are positive as indicated by the curve of Fig. 3(*a*). A capacitor 54 shunting the load resistor 53 reduces the high frequency response of the amplifier, preferably so that roll-off will occur at 5 kc. A rectifying circuit including a unilateral impedance device shown here as a diode rectifier tube 56, coupled to the load resistor 53 by means of a capacitor 57 and a load resistor 58, operates on the black peaks of signal to produce a positive unidirectional voltage at the cathode of the diode 56. The components of the interstage capacitance-resistance networks 41—42, 47—48, 57—58 have values providing time constants at which the maximum response to the input signal is at the frequency corresponding to the given deflection rate, which is usually the vertical deflection rate of 60 cycles per second. Preferably the potential wave appearing across the diode 56 is filtered to remove rapidly varying transients, and a simple resistance-capacitance filtering circuit constituted by a series resistor 61 and a shunt capacitor 62 as shown will generally be sufficient for the purpose. The direct control potential available at the output of the filter is directly proportional to the average light level on the target of the image pickup tube 12.

Since the target is scanned at the vertical deflection rate of 60 cycles per second over the full raster, disregarding interlace, the background or average target current incorporates a waveform of the fundamental vertical deflection frequency, which in the application of the invention provides a simplified but dependable means of obtaining from an A.-C. voltage a direct potential proportional to the average light level at the target. The apparatus according to the invention has the decided advantage that the common noise pickup, caused by obtaining low level direct potential changes from the target circuit of the pickup tube across a high impedance element, which would be amplified in the prior art arrangements, is eliminated so that the control device of the invention cannot miscompensate for the light level at the target. Also the stability of the arrangement according to the invention is much greater than that of a D.-C. voltage amplifier and the background amplifier of the invention is much lighter and less bulky than the prior art arrangements wherein a chopper was used to provide an A.-C. voltage proportional to the D.-C. difference at the normal iris setting and in which an integrating network had to be incorporated to decrease the distortion introduced by the chopper. Furthermore the video signal may be obtained from a camera control unit so that special cables are not necessary. This circuit arrangement is also suggested for use in the design of automatic brightness controls to be used with television image pickup tubes and the like.

The direction control potential is applied to the grid of a motor controlling electron discharge device or triode tube 64 having switching apparatus in the form of two relays 66, 67 with windings 68, 69 connected in series to form the anode load. Each relay has associated therewith an armature comprising an arm and a set of double contacts making each relay effectively a single pole double throw switch. The relays have different pull-in current characteristics, which is either inherent in the relays themselves or in the external connections. For example, the holding relay 66 is made to pull-in before reversing relay 67 by virtue of a resistor 71 shunting the winding 69 of the relay 67 to require much heavier current flow through the parallel paths before the relay 67 will pull in. The motor controlling tube 64 is biased by means of a voltage dividing network comprising a resistor 72, a potentiometer 73 and another resistor 74 connected across an energizing potential source. The voltage dividing arrangement being unbypassed provides inverse current feedback in the cathode circuit making the circuit arrangement extremely stable with low current consumption. The particular points at which the relays 66 and 67 pull in are adjusted by varying the arm of the potentiometer 73.

The electric motor 28′ is a type having two windings connected to terminals 79, 80 and 80, 81 respectively, note that terminal 80 is a common terminal to both windings, although it should be understood that separate terminals might be provided and interconnected externally of the motor. The electric motor 28′ is energized to run in a given direction by a lead from a terminal 84 of a source of A.-C. motor energizing potential connected to the common terminal 80. A lead from the other terminal 85 of the energizing source is applied through a resistor 88, the resistance of which can be neglected for the moment, to the arm 90 of relay 67 and through a normally closed limit switch 92 to one motor winding terminal 79. Another lead from the other terminal 85 of the electric motor energizing source is applied to phase shifting capacitive reactance apparatus at one electrode of a capacitor 94, the other electrode of which is connected through the arm 96 of relay 66 and another normally closed switch 98 to the other motor winding terminal 81. The other electric motor winding is thereby energized through the phase shifting capacitor 94 so that the voltages across the two windings of the electric motor 28′ are substantially in phase quadrature. A pair of capacitors 101 and 102 and a pair of resistors 103, 104 are connected in conventional fashion to suppress noise normally generated in such relay switching arrangements. As the iris control potential is increased to the point where the stopping relay 66 is pulled in, the other terminal 85 of the motor energizing source is connected to the other motor winding terminal 81 through a resistor 106, the resistance of which may be disregarded for the moment, through the arm 96 of the relay 66, and through a normally closed limit switch 98 so that the voltages across both motor windings are substantially in phase and cease driving the motor 28′ causing it to remain in an idle condition—energized but held immovable by the in-phase voltages. When the control potential goes sufficiently positive to cause the motor controlling tube 64 to draw sufficient current to energize the reversing relay 67, the motor energizing potential at the terminal 85 will be applied through the series resistor 88, the impedance of which may be ignored for the present, through a series capacitor 108, which is another part of the capacitive reactance apparatus, through the arm 90 of the reverse relay 66 and through the normally closed limit switch 92 to the winding terminal 79, whereby the voltage across the one winding is in phase quadrature in the opposite direction with the voltage across the other winding between the terminals 80, 81 so that the motor 28′ will rotate in the opposite direction. Thus an electric motor can be run in either direction or held idle by means of a simple circuit of high stability and low current consumption.

Further according to the invention the heat rise which is encountered with full current flowing through both windings of the motor 28′ in the idle, that is stopped but energized, condition is reduced to a quarter of the normal value by the interposition of the above mentioned series resistors 88, 106. These resistors are interposed in the circuit at points where only one resistor remains in the circuit when the motor is running in either direction and therefore will not reduce the torque or speed appreciably for any practical purpose. The use of a single resistor in the common lead to the one motor winding terminal 80 would reduce the heat rise by only ½ of the normal value but decrease the voltage across both motor windings in the running condition to an undesirable extent.

The usual iris diaphragm device, as schematically indicated by the diaphragm 18′, and the conventional or most commonly used neutral density filters are arranged for a finite rotation in either direction; that is, the devices are not arranged for continuous rotation. Regardless of the control potential applied to the driving motor, the circuit arrangement must be arranged so that the motor is stopped when the iris diaphragm or neutral density filter reaches the preset limit in either direction of rotation. Preferably the motor circuitry should be arranged so that when the motor is stopped by the device 18′ reaching either limit of rotation the motor is in an idle, but energized, condition ready for rotation in the reverse direction immediately upon the control potential reaching the value corresponding to the call for such operation. According to the invention this is arranged by interposing the limit switches 92, 98 in the motor winding leads and shunting the terminals of the switches with series capacitors 112, 118. As shown the electric motor 28′ is energized to operate in a forward direction with the one motor winding between the terminals 79, 80 in phase with the applied voltage from the terminals 84, 85 and the other motor winding between the terminals 80, 81 energized in phase through the series capacitor 94. If the motor continues to run until the device driven reaches the preset limit, the limit switch 92 will be opened placing the capacitor 112, shunting the switch 92, in series with the one motor winding so that the voltage across the one winding is again in phase with that on the other motor winding due to the phase shift provided by the added series capacitor 112, placing the motor 28′ in the idle condition. In this condition, there is current flowing through both windings so that the motor is energized and will reverse the direction of rotation immediately upon the switching of the normal series capacitor 94 to that of 108 rephasing the windings for rotation in the opposite direction. With the motor 28′ in the idle condition, therefore, energization of the relays 66, 67 calling for reversal of the motor will cause the motor to start running in the opposite direction. At the time of starting there will be two capacitors in series so that the voltage across the motor windings will be less than 90 degrees out of phase. With equal values of capacitors the capacitance in the circuit at the time of starting will be ½ of the normal value, but most motors of the type used for this purpose will start with roughly ⅓ of the normal value of capacitance. In fact, tests have shown that a decrease of capacitance of 40% for the two capacitors shunting the limit switches will still provide good results. As the motor runs for a few revolutions the limit switch will be closed because the rotation of the motor shaft will release the pressure on the limit switch and the normal capacitance will again be interposed in the windings to render them substantially in phase quadrature.

This travel limiting circuit arrangement according to the invention can be simplified for arrangements wherein switching may be made responsive to a call for direct reversal; that is, without an intermediate range calling for an idle condition. In this case the limit switches are connected directly to opposite electrodes of a single series capacitors and the other terminal of the motor energizing circuit source is connected to the arm of a switching device effecting a single pole double throw switch, the terminals of which are connected individually to the electrodes of the single starting capacitor. Reversal is then made by throwing the switch from one terminal of the capacitor to the other to effectively insert the capacitor in series with the opposite winding of the motor to reverse the direction of rotation from that which caused the limit switch to be opened previously. The stopping arrangement is fail safe because phase shift necessary for stopping and reversing is obtained by a capacitor and a motor winding itself which are located on one chassis eliminating trouble due to cable failure and the like.

It will be appreciated that the entire background amplifier motor controlling circuit and motor are sufficiently light and compact as to permit mounting directly on or incorporating within a televison camera device, including the small vidicon type cameras used in closed loop industrial television applications as well as the large studio cameras. The elimination of a number of troublesome interconnecting cables and separate pieces of apparatus is of considerable advantage in promoting the ease of handling the television camera equipment. In addition one embodiment of the circuitry according to the invention has been constructed and operated on five watts of power against approximately 55 watts of power required for the conventional type of automatic iris control. In this application of the invention the following component parts values were used.

| Ref. No. | Component | Type or Value |
|---|---|---|
| 38 | Cathode resistor | 75 ohms. |
| 41 | Coupling capacitor | 0.03 mf. |
| 42 | Grid resistor | 1 mo. |
| 44 | Signal amplifier | ½ 12AT7. |
| 45 | Load resistor | 220 ko. |
| 47 | Coupling capacitor | 820 mf. |
| 48 | Grid resistor | 1 mo. |
| 50 | Signal amplifier | ½ 12AT7. |
| 53 | Load resistor | 91 ko. |
| 54 | Frequency limiting capacitor | 2000 mf. |
| 56 | Signal rectifier | ½ AL5. |
| 57 | Coupling capacitor | 0.03 mf. |
| 58 | Load resistor | 2.2 mo. |
| 61 | Filter resistor | 1 mo. |
| 62 | Filter capacitor | 0.047 mf. |
| 64 | Motor control tube | ½ 12AU7. |
| 71 | Shunt resistor | 39 ko. |
| 72 | Series resistor | 56 ko. |
| 73 | Variable resistor | 10 ko. |
| 74 | Series resistor | 5 ko. |
| 88 | do | 3.9 ko. |
| 94 | Series capacitor | 1.0 mf. |
| 101 | Noise suppressing capacitor | 0.005 mf. |
| 102 | do | 2.2 ko. |
| 106 | Series resistor | 3.9 ko. |
| 108 | Series capacitor | 1.0 mf. |
| 112 | do | 1.0 mf. |
| 118 | do | 1.0 mf. |

A direct control potential of 0 to +15 volts was developed at the grid of the control tube 64 with the bias adjustment providing between +5 and +30 volts on the cathode of the control tube 64.

The circuitry constructed was operated on 6 milliamperes current drain and the motor 28 did not change direction or stop with energizing potential variations or heater voltage changes of plus or minus 30%. The operating energizing voltage was 200 volts at the points marked with the plus (+) sign.

The invention claimed is:

1. A circuit for controlling a reversible electric motor having two windings in response to a control potential, including an electron discharge device having cathode, control and anode electrodes, means to apply said control potential between said control and said cathode electrodes, means to apply energizing potential between said cathode and anode electrodes, a pair of relays of different pull in current charateristics, having windings connected in series between said anode electrode and said energizing potential means, each of said relays having an armature structure associated therewith and double throw contacts associated with each armature, individual means coupling given terminals of said motor windings and said armatures, capacitors individually connected between the contacts associated with each of said armatures, a lead from one pole of a source of motor energizing voltage to a normally idle contact of one of said relays and to a normally active contact of the other of one of said relays, and a lead from the other pole of said source of motor energizing voltage to both of the other terminals of said motor windings.

2. A circuit for controlling a reversible electric motor having two windings arranged for rotation of the armature with respect to the stator upon the application to said windings of voltages in phase quadrature, said armature having a motor drive shaft coupled thereto, said circuit including a lead from one pole of a source of motor energizing voltage to a terminal common to both of said windings, a capacitor having a terminal connected to the terminal of one of said windings remote from said common terminal, a limit switch normally short circuiting said capacitor, another capacitor having a terminal connected to the terminal of the other of said windings remote from said common terminal, another limit switch normally short circuiting said other capacitor, and a circuit comprising capacitive reactance and switching apparatus arranged to interconnect the remaining terminals of said capacitors and selectively connect the other pole of said energizing voltage source to the other terminal of one of said capacitors, one of said limit switches being operable in response to the motor drive shaft reaching the end of travel in one direction to hold said motor in energized condition for reversal of rotation in response to the application of motor energizing voltage to the other terminal of the other capacitor.

3. A circuit for controlling a reversible electric motor having two windings arranged for rotation of the armature with respect to the stator upon the application to said windings of voltages in phase quadrature, said armature having a motor drive shaft coupled thereto, said circuit including a lead from one pole of a source of motor energizing voltage to a terminal common to both of said windings, a capacitor having a terminal connected to the terminal of one of said windings remote from said common terminal, a limit switch normally short circuiting said capacitor, another capacitor having a terminal connected to the terminal of the other of said windings remote from said common terminal, another limit switch normally short circuiting said other capacitor, capacitive reactance apparatus interconnecting the remaining terminal of the first said and said other capacitors, and switching apparatus for selectively connecting the other pole of said energizing voltage source to the terminals of said further capacitor, said limit switches being alternately operable in response to the motor drive shaft reaching the end of travel in a desired direction to hold said motor in energized condition for reversal of rotation in response to the application of motor energizing voltage to the other terminal of said further capacitor.

4. A circuit for reversing a reversible electric motor having two windings arranged for rotation of the armature with respect to the stator upon the application to said winding of voltages in phase quadrature, including a lead from one pole of a source of motor energizing voltage to a terminal common to both of said motor windings, switching apparatus comprising a double arm switch element having double-throw contact associated with each arm, a lead from the other pole of said motor energizing voltage to one contact of one of said switching elements and to the correspondingly opposite contact of the other, capacitive reactance apparatus in the form of a pair of capacitors individually connected between the double-throw contacts of each of said switching elements, and individual leads between the arms of said switching elements and the remaining terminals of said motor windings.

5. A circuit for reversing a reversible electric motor having two windings arranged for rotation of the armature with respect to the stator upon the application to said winding of voltages in phase quadrature, including a lead from one pole of a source of motor energizing voltage to a terminal common to both of said motor windings, switching apparatus comprising a double arm switching element having double-throw contacts associated with each arm, a pair of resistors connected individually between the other pole of said motor energizing voltage and one contact of one of said switching elements and the correspondingly opposite contact of the other switching element, capacitive reactance apparatus in the form of a capacitor connected between the double-throw contacts of one of said switching elements, and another capacitor connected in series across the contact of the other switching element with the one of said pair of resistors associated with that switching element and individual leads between the arms of said switching elements and the remaining terminals of said motor windings.

6. A circuit for reversing a reversible electric motor having two windings arranged for rotation of the armature with respect to the stator upon the application to said windings of voltages in phase quadrature, including a lead from one pole of a source of motor energizing voltage to a terminal common to both of said motor windings, switching apparatus comprising a double arm switching element having double-throw contact associated with each arm, a lead from the other pole of said motor energizing voltage to one contact of one of said switching elements and to the correspondingly opposite contact of the other, capacitive reactance apparatus in the form of a pair of capacitors individually connected between the double-throw contacts of each of said switching elements, individual normally closed limit switches connected between the arms of said switching elements and the remaining terminals of said motor windings, and capacitors individually connected across said limit switches.

7. A circuit for controlling a reversible electric motor having two windings in response to a control potential, including an electron discharge device having a cathode, control and anode electrodes, means to apply said control potential between said control and said cathode electrodes, means to apply an energizing potential between said cathode and anode electrodes, a pair of relays of different pull in current characteristics, having windings connected in series between said anode electrode and said energizing potential means, whereby the current flow through said relay windings is controlled by said control potential, a pair of capacitance means, each of said relays being adapted to selectively couple a different one of said capacitance means between one pole of a source of motor energization voltage and one terminal of a different one of said motor windings, and means coupling the other pole of said source of motor energizing voltage to the other terminals of said motor windings whereby the motor is driven in a direction depending on said control potential.

References Cited in the file of this patent

UNITED STATES PATENTS

| | | |
|---|---|---|
| 2,417,506 | Lamb | Mar. 18, 1947 |
| 2,421,476 | Belar et al. | June 3, 1947 |
| 2,484,790 | Hartig | Oct. 11, 1949 |
| 2,598,922 | Konick et al. | June 3, 1952 |
| 2,664,533 | Raab | Dec. 29, 1953 |